United States Patent [19]

Sfarti et al.

[11] Patent Number: 4,914,622
[45] Date of Patent: Apr. 3, 1990

[54] ARRAY-ORGANIZED BIT MAP WITH A BARREL SHIFTER

[75] Inventors: Adrian Sfarti; Randy Goettsch, both of Sunnyvale, Calif.

[73] Assignee: Advanced Micro Devices, Inc., Sunnyvale, Calif.

[21] Appl. No.: 40,519

[22] Filed: Apr. 17, 1987

[51] Int. Cl.[4] .............................................. G06F 9/00
[52] U.S. Cl. ................................ 364/900; 364/927.2; 364/927.7; 364/929.1; 364/95; 364/927.5; 364/947.6
[58] Field of Search ................ 364/200, 900; 340/798, 340/726; 365/230

[56] References Cited

U.S. PATENT DOCUMENTS 4,644,503  2/1987  Bantz et al. ........................ 365/230
4,729,119  3/1988  Dennison et al. .................... 365/230
4,755,810  7/1988  Knierim ............................ 340/726

OTHER PUBLICATIONS

A VLSI Architecture for Updating Raster-Scan Displays, Satish Gupta & Robert F. Sproull, *Computer Graphics*, vol. 15, No. 3, Aug. 1981, pp. 71-78.

*Primary Examiner*—Gareth D. Shaw
*Assistant Examiner*—John G. Mills
*Attorney, Agent, or Firm*—Fliesler, Dubb, Meyer & Lovejoy

[57] ABSTRACT

A graphics processor having a bit map comprising a plurality of memory planes is provided with an 8×8 barrel shifter which is responsive to a plurality of control signals for selectively shifting bits within the planes and/or between planes.

18 Claims, 9 Drawing Sheets

| 2 1 0 | SHIFTER OUTPUT DATA-LINE ⟨n⟩ | | | | | | | | | | | | | |
|---|---|---|---|---|---|---|---|---|---|---|---|---|---|---|
| | 63 | 62 | ... | 11 | 10 | 9 | 8 | 7 | 6 | 5 | 4 | 3 | 2 | 1 | 0 |
| i | INPUTS APPEARING AT SHIFTER OUTPUT DATA LINES | | | | | | | | | | | | | |
| 0 0 0 | 63 | 62 | ... | 11 | 10 | 9 | 8 | 7 | 6 | 5 | 4 | 3 | 2 | 1 | 0 |
| 0 0 1 | 62 | 61 | ... | 10 | 9 | 8 | 15 | 6 | 5 | 4 | 3 | 2 | 1 | 0 | 7 |
| 0 1 0 | 61 | 60 | ... | 9 | 8 | 15 | 14 | 5 | 4 | 3 | 2 | 1 | 0 | 7 | 6 |
| 0 1 1 | 60 | 59 | ... | 8 | 15 | 14 | 13 | 4 | 3 | 2 | 1 | 0 | 7 | 6 | 5 |
| 1 0 0 | 59 | 58 | ... | 15 | 14 | 13 | 12 | 3 | 2 | 1 | 0 | 7 | 6 | 5 | 4 |
| 1 0 1 | 58 | 57 | ... | 14 | 13 | 12 | 11 | 2 | 1 | 0 | 7 | 6 | 5 | 4 | 3 |
| 1 1 0 | 57 | 56 | ... | 13 | 12 | 11 | 10 | 1 | 0 | 7 | 6 | 5 | 4 | 3 | 2 |
| 1 1 1 | 56 | 63 | ... | 12 | 11 | 10 | 9 | 0 | 7 | 6 | 5 | 4 | 3 | 2 | 1 |

| 2 1 0 | SHIFTER OUTPUT DATA-LINE ⟨n⟩ | | | | | | | | | | | | | |
|---|---|---|---|---|---|---|---|---|---|---|---|---|---|---|
| | 63 | 62 | ... | 11 | 10 | 9 | 8 | 7 | 6 | 5 | 4 | 3 | 2 | 1 | 0 |
| j | INPUTS APPEARING AT SHIFTER OUTPUT DATA LINES | | | | | | | | | | | | | |
| 0 0 0 | 63 | 62 | ... | 11 | 10 | 9 | 8 | 7 | 6 | 5 | 4 | 3 | 2 | 1 | 0 |
| 0 0 1 | 55 | 54 | ... | 3 | 2 | 1 | 0 | 63 | 62 | 61 | 60 | 59 | 58 | 57 | 56 |
| 0 1 0 | 47 | 46 | ... | 59 | 58 | 57 | 56 | 55 | 54 | 53 | 52 | 51 | 50 | 49 | 48 |
| 0 1 1 | 39 | 38 | ... | 51 | 50 | 49 | 48 | 47 | 46 | 45 | 44 | 43 | 42 | 41 | 40 |
| 1 0 0 | 31 | 30 | ... | 43 | 42 | 41 | 40 | 39 | 38 | 37 | 36 | 35 | 34 | 33 | 32 |
| 1 0 1 | 23 | 22 | ... | 35 | 34 | 33 | 32 | 31 | 30 | 29 | 28 | 27 | 26 | 25 | 24 |
| 1 1 0 | 15 | 14 | ... | 27 | 26 | 25 | 24 | 23 | 22 | 21 | 20 | 19 | 18 | 17 | 16 |
| 1 1 1 | 7 | 6 | ... | 19 | 18 | 17 | 16 | 15 | 14 | 13 | 12 | 11 | 10 | 9 | 8 |

ARRAY-ORGANIZED BIT MAP WITH A BARREL SHIFTER

BACKGROUND OF THE INVENTION

1. Field of the Invention

The present invention relates to a graphics processor comprising an array-organized memory in general and in particular to a graphics processor comprising an array-organized memory and a dynamically controllable barrel shifter for accommodating the transfer of variable sized memory arrays between a data processor and the memory.

2. Description of the Prior Art

In applicants' U.S. Pat. No. 4,773,044, issued Sept. 20, 1988, entitled ARRAY-WORD-ORGANIZED DISPLAY MEMORY AND ADDRESS GENERATOR WITH TIME MULTIPLEXED ADDRESS BUS and assigned to the assignee of the present application and an article entitled "A VLSI Architecture for Updating Raster-Scan Displays" by Satish Gupta and Robert F. Sproull, *Computer Graphics*, Volume 15, Number 3, August 1981, pp. 71-78, a graphics processor comprising an array-organized memory is disclosed.

In a graphics processor, graphics information displayed on a display screen is stored in a bit map. To change the graphics information displayed on the screen and the corresponding bits stored in the bit map, the bits are read from the bit map to a data processing unit in the graphics processor, processed and written back into the bit map.

Frequently, data displayed on a screen and/or stored in a bit map are referred to as comprising pixels. In reference to a display screen, a pixel is typically a single dot on the screen which may comprise one of a variety of colors and/or intensities. In referring to a bit map, a pixel may comprise a plurality of bits. In a bit map comprising a plurality of memory planes, a pixel typically comprises a bit from the same location in each of the planes.

In a processor having an array-organized bit map, each array of pixels on the screen is considered a word and each pixel in a word comprises one or more bits in a bit map, depending on the number of memory planes in the bit map. For example, a 64-pixel word comprises an array of 8 rows and 8 columns of bits in 1 plane in a bit map, a 16-pixel word comprises 4 rows and 4 columns of bits in each of 4 planes in a bit map, a 4-pixel word comprises 2 rows and 2 columns of bits in each of 16 planes in a bit map. For each size of display, there is a one-to-one relationship between the location of each array of pixels on the display and the corresponding bits in the bit map. For example, a 1K×1K bit map comprises 1024 rows and 1024 columns of pixels on a display or, in terms of an 8×8×1 array, 128 rows and 128 columns of 8×8×1 arrays. The boundaries of each array of pixels are commonly referred to as word boundaries.

At times it is desirable to modify graphic data displayed on a screen which crosses one or more of the word boundaries on the screen. In these cases, bits in two or more words in the bit map must be transferred between the bit map and the data processing unit. However, it is found that when the data is transferred between the bit map and the data processing unit, the bits become scrambled. The bits become scrambled due to the difference between where the pixels are located from a logical standpoint in the array as they appear on the screen versus the way the bits forming the pixels are located from a physical standpoint in the memory. For example, assume that a screen comprises a plurality of rows and columns of words wherein each word comprises an 8×8 array of pixels and that adjacent words in the top row of words on the screen are designated 1 and 2. Further, assume that an 8×8 array of the pixels comprised of a group of pixels A from word 1 and a group of pixels B from word 2 are read to the data processing unit for modification. If this is done without providing for the scrambling which naturally results when such a transfer takes place, the location of the pixels A and B will be reversed in the data processing unit.

As a further example, assume that the 8×8 array of pixels to be read to the data processing unit, in addition to pixels A and B from words 1 and 2, also comprises pixels C and D from the words located below words 1 and 2. In that case, not only is the location of the pixels A and B reversed in the data processing unit, but the location of the pixels C and D are reversed and the location of pixels A and B as a group and the pixels C and D as a group are reversed.

In order to accommodate the negative effects of pixel scrambling, i.e. the reversal of pixel groups as they are transferred between a data processing unit and a bit map in systems comprising 8×8 arrays of pixels as described above, the use of a barrel shifter has been proposed as disclosed in Gupta et al, supra.

In Gupta et al, to process an array of bits in a memory corresponding to an 8×8 array of pixels on a screen, a 64 bit input barrel shifter and a 64 bit output barrel shifter are disclosed. Each bit in the array is coupled to one of the 64 inputs of the barrel shifters on a one-to-one basis. In operation, each of the inputs is thereafter selectively coupled to one and only one of the shifters 64 outputs depending on the amount of rotation that is required as defined by the values of the parameters i and j described in the above-identified patent application where $$i = \text{remainder}\left(\frac{x}{AWS_x}\right)$$

$$j = \text{remainder}\left(\frac{y}{AWS_y}\right)$$

x = the column address of a pixel on the screen
y = the row address of a pixel on the screen
$AWS_x$ = the number of pixels in an array on the screen in the x direction
$AWS_y$ = the number of pixels in on the screen in the y direction The integer quantities x, y, $AWS_x$ and $AWS_y$ are predetermined quantities which are supplied by the operator and stored in the apparatus used for calculating i and j. The term "remainder" stands for the remainder resulting from dividing two integers.

While the Gupta et al type system is designed to handle the scrambling of pixels from 8×8 pixel arrays, there is no provision for handling different sized arrays. For example, there is no provision for handling 4×4 pixel arrays comprising 4×4×4 bit arrays or 2×2 pixel arrays comprising 2×2×16 bit arrays. Moreover, there is no provision for rotating bits between planes in such arrays.

SUMMARY OF THE INVENTION

In view of the foregoing, principal objects of the present invention are a method and apparatus for rotating various sized arrays of bits being transferred between a bit map and a graphics processor in two and/or three dimensions.

In each embodiment of the present invention the bits in each array of pixels are evenly distributed among multiple memory planes and the 64 input/output ports therefor are coupled to a conventional 8×8 barrel shifter. In a first embodiment the 64 input/output ports of the memory are hardwired to groups of the input-/output ports of each barrel shifter with the size of each such group corresponding to the number of planes in each array. For example, in the case of a bit map comprising a plurality of 4×4×4 arrays, one bit from each of the 4 planes in the array is coupled to one of the 4 inputs in a group of 4 inputs of the barrel shifter. Similarly, in the case of a bit map comprising a plurality of 2×2×16 arrays, one bit from each of the 16 planes in the array is coupled to one of the 16 inputs in a group of 16 inputs of the barrel shifter. Thereafter, control signals applied to the barrel shifter cause the barrel shifter to shift or rotate the groups of inputs to the barrel shifter by an amount corresponding to the magnitude of the control signals.

In another embodiment of the present invention, instead of hardwiring the bit map to the barrel shifters, a multiplexer or other suitable signal routing circuit is used for transferring bits between memory planes and selected groups of barrel shifter inputs and outputs.

In another embodiment of the present invention, the control signals applied to the barrel shifters for controlling the amount of rotation of the bits in two dimensions, i.e. within a plane of the bit map, is changed dynamically depending on the size of the arrays to be rotated.

In still another embodiment of the present invention, the control signals applied to the barrel shifters are provided to have a magnitude which results in an exchange of bits between memory planes in an array.

BRIEF DESCRIPTION OF THE DRAWINGS

Other objects, features and advantages of the present invention will become apparent upon consideration of the following detailed description and the accompany drawings, in which like reference designations represent like features throughout the figures.

DETAILED DESCRIPTION OF THE INVENTION

Figure 1:
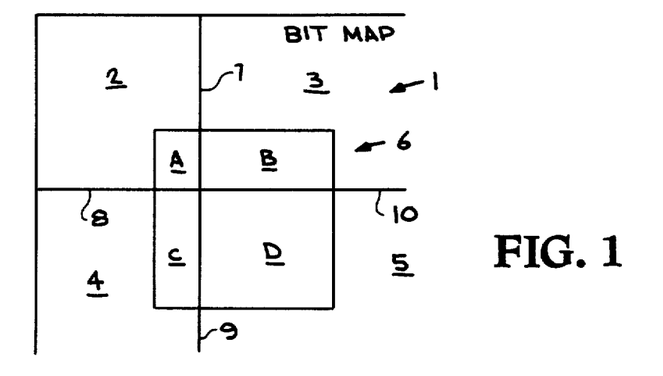
FIG. 1 is a representation of a bit map with an 8×8 array of bits taken from four adjacent 8×8 arrays.
Figure 2:
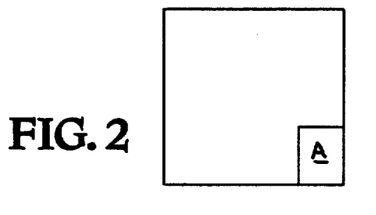
FIGS. 2–5 are representations of the four arrays shown in FIG. 1.
Figure 3:
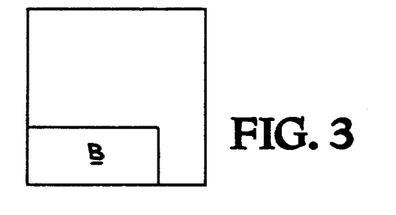
Figure 4:
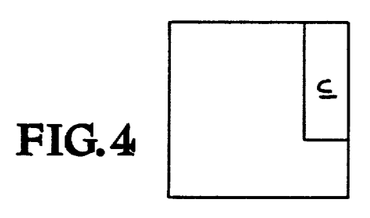
Figure 5:
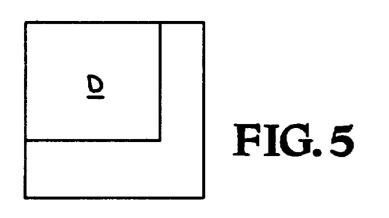

Referring to FIG. 1, there is provided a representation of a bit map designated generally as 1. In the bit map 1 there is provided a plurality of 8×8 arrays of bits, four of which are shown, designated 2, 3, 4 and 5. Superimposed on the arrays 2, 3, 4 and 5 is another 8×8 array designated generally as 6. The array 6 is made up of a number of bits from each of the arrays 2–5. Adjacent edges of the arrays 2–5 are represented by vertical and horizontal lines 7, 8, 9 and 10. The lines 7–10 are called "word boundaries" to indicate that the arrays 2, 3, 4 and 5 which they bound are words. The array 6 thus crosses the word boundaries 7–10.

As previously described, when an array of bits such as array 6 is transferred from a bit map to a data processing unit in a graphics processor, the data from the bit map arrives scrambled (swizzled) into the graphics processor due to the difference between where the bits are located from a logical standpoint in the array versus the way data is located from a physical standpoint in the memory.

Figure 6:
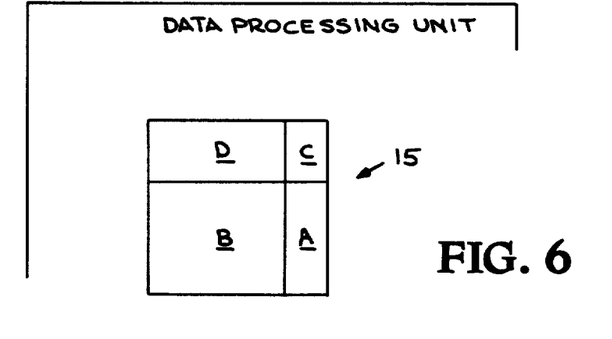
FIG. 6 is a representation of a data processing unit with the array of FIG. 1 shown scrambled.

As seen in FIG. 1, array 6 comprises a number of bits from the array 2 which are designated A, a number of bits from the array 3 which are designated B, a number of bits from the array 4 which are designated C and a number of bits from the array 5 which are designated D. The bits A are located in the lower righthand corner of the array 2. The bits B are located in the lower lefthand corner of the array 3. The bits C are located in the upper righthand corner of the array 4 and the bits D are located in the upper lefthand corner of the array 5. As more clearly shown in FIGS. 2–5, when the data from the bit map is transferred to the data processing unit, the bits A, B, C and D become scrambled such that in the data processing unit they appear in their logical position, as shown in FIG. 6. That is, in the data processing unit, the bits D appear in the upper lefthand corner of the memory of the data processing unit, the bits C appear in the upper righthand corner of the array of the data processing unit and the bits B and A appear, respectively, in the lower lefthand corner and the lower righthand corner of the data processing unit. The bits A, B, C and D as thus rearranged form an array designated 15.

Figure 7:
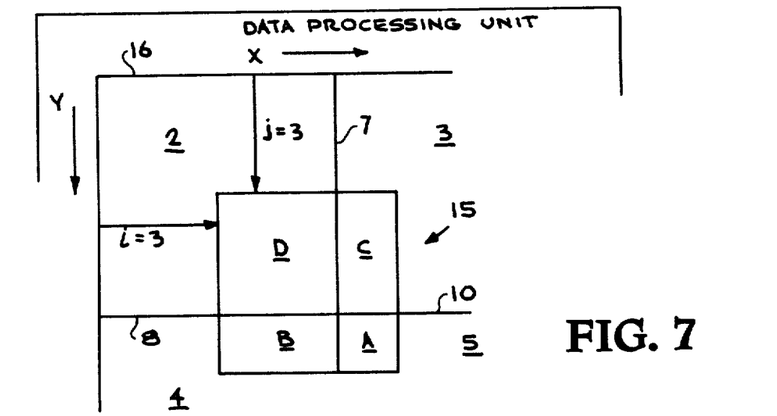
FIG. 7 is a representation of a data processing unit with the scrambled array as shown in FIG. 6 accompanied by position identification designators i and j.

Referring to FIG. 7, array 15 is shown in the memory of a data processing unit. Its location in the memory is measured relative to an x axis 16 and a y axis 17 corresponding to the horizontal and vertical boundaries of a word. As shown in FIG. 7, if the bit in the upper lefthand corner of the array 15 is designated 0,0 and the distance in the x direction from the vertical word boundary is designated i and the distance in the y direction from the horizontal word boundary is designated j, it can be seen that the location of the bit 0,0 is i=3 and j=3.

Figure 8:
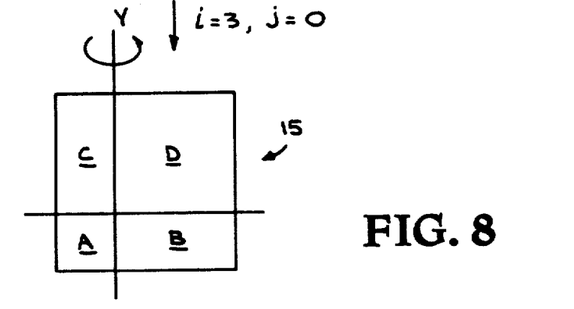
FIGS. 8 and 9 are representations of the elements of the array of FIG. 7 showing two stages of descrambling to return the array of FIG. 7 to that shown in FIG. 1.
Figure 9:
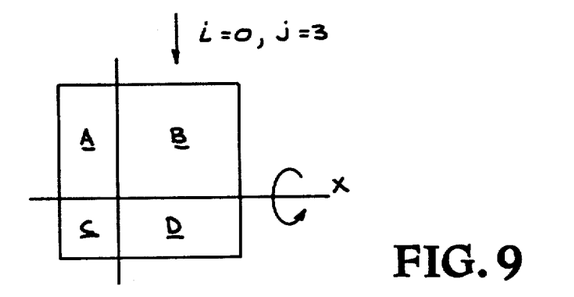

To realign the bits A, B, C and D in the array 15 to the position they had in the bit map as shown in FIG. 1, it is necessary to shift or rotate the bits A, B, C and D as shown in FIGS. 8 and 9.

As seen in FIG. 8, with i=3 and j=0, the three columns of bits C and A and 5 columns of bits D and B of FIG. 7, as represented by dots along the upper and left margins thereof, are shifted or rotated about an axis y. In FIG. 9 with i=0 and j=3, the three rows of bits A and B and the 5 rows of bits C and D of FIG. 8 are shifted or rotated about an axis x such that when the shifting or rotating operations are completed, the bits A, B, C and D are aligned as shown in FIG. 1.

While the shifting or rotation of the bits A, B, C and D was described above as separate and sequential operations, it should be understood, as will be further described below, that these operations usually are performed simultaneously.

Figure 10:
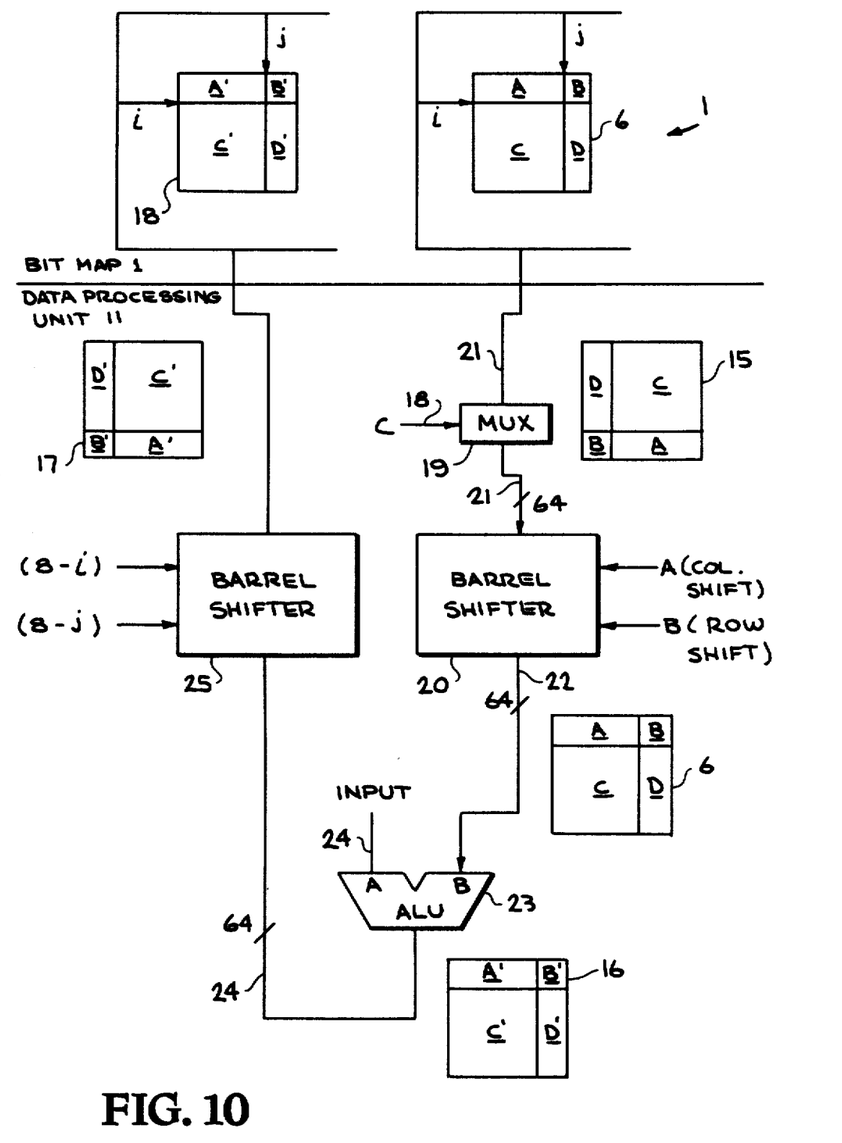
FIG. 10 is an embodiment of the present invention used for shifting the arrays of a bit map when they are transferred from a bit map to a data processing unit and back.

Referring to FIG. 10, there is provided a graphic description of the bit map 1 and the data processing unit 11. In the bit map 1 there is provided a representation of the array 6 as described above with respect to FIG. 1. In the data processing unit 11 there is provided a multiplexer (MUX) 19, a first barrel shifter 20 coupled to a 64-line input bus 21, a 64-line output bus 22 and a pair of control signal input lines A and B. A corresponds to i and B correspond to j, as computed in the data processing unit 11 following the formulas described above. In an arithmetic logic unit (ALU) 23 having two inputs A and B, input A is coupled to an input line 24 designated INPUT. Input B is coupled to the 64-line bus 22. The output of the ALU 23 is coupled by means of a 64-line bus 24 to a second barrel shifter 25. The barrel shifter 25 is provided with an output coupled to a 64-line bus 26 and has two control signal inputs designated (8-i) and (8-j). The MUX 19 is provided for selectively coupling bits from the array 6 to the inputs of the barrel shifter 20 in response to a control signal C on a signal line 18.

In operation, as the bits A, B, C and D of the array 6 in the bit map 1 are transferred to the data processing unit 11, they are scrambled and appear on the bus 21 as the array 15 described above with respect to FIG. 6. As will be further described below, the barrel shifter 20, in response to the control signals A and B, shifts or rotates the bits A, B, C and D in the array 15 to realign them so they are once again aligned as they were in the array 6. This is shown by the representation of the array 6 next to the signal bus 22 at the input to the ALU 23. Next to the output of the ALU 23 there is shown another array designated 16 comprising bits A', B', C' and D'. The primes are used to represent that one or more of the bits in the array 6 has been inverted but that all of the bits have the same relative position as they had in the array 6. The array 16 is then applied to the input of the barrel shifter 25 and, like the barrel shifter 20, the barrel shifter 25, in response to the control signals (8-i) and (8-j), shifts or rotates the relative positions of the bit groups A', B', C' and D' so that they appear on the output thereof as shown in the block to the left of the signal bus 64 at the output of the barrel shifter 25. For convenience, this array is designated 17. As the array 17 is transferred from the barrel shifter 25 to the bit map 1, the bit groups A', B', C' and D' are scrambled in the same manner as the bit groups in the array 6 such that when they are stored in the bit map 1, they have the original relative positions as the bit groups A, B, C and D, respectively, in the array 6. For convenience, this array is designated 18.

Figure 11:
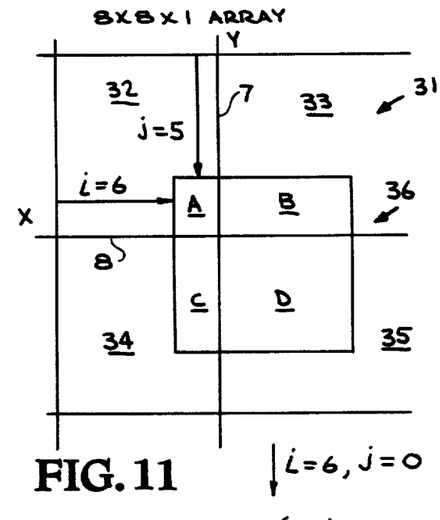
FIGS. 11 and 12 are representations of an 8×8×1 array.

Referring to FIG. 11, the operation of the barrel shifters 20 and 25 will now be described in further detail. In FIG. 11 there is represented a bit map designated generally as 31 comprising a plurality of 8×8 arrays of bits designated generally as 32, 33, 34 and 35. To show the operation of the barrel shifter 20, an 8×8 array of bits 36 is transferred to the barrel shifter 20 from the bit map. The array 36 comprises a group of bits A taken from the lower righthand corner of the array 32, a group of bits B taken from the lower lefthand corner of the array 33, a group of bits C taken from the upper righthand corner of the array 34 and a group of bits D taken from the upper lefthand corner of the array 35. The location of the bits A, B, C and D in the arrays 32-35 is identified by the addresses i and j where $$i = \text{remainder}\left(\frac{x}{AWS_x}\right)$$

$$j = \text{remainder}\left(\frac{y}{AWS_y}\right)$$

x = the column address of a pixel on the screen
y = the row address of a pixel on the screen
$AWS_x$ = the number of pixels in an array on the screen in the x direction
$AWS_y$ = the number of pixels in an array on the screen in the y direction The integer quantities x, y, $AWS_x$ and $AWS_y$ are predetermined quantities which are supplied by the operator and stored in the apparatus used for calculating i and j. The term "remainder" stands for the remainder resulting for dividing the two integers within the parentheses in the above equations.

In the following description, i=6 and j=5.

Figure 12:
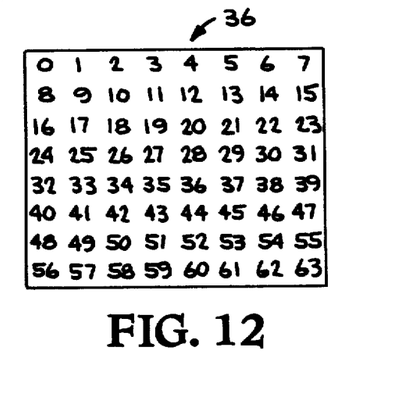
Figure 13:
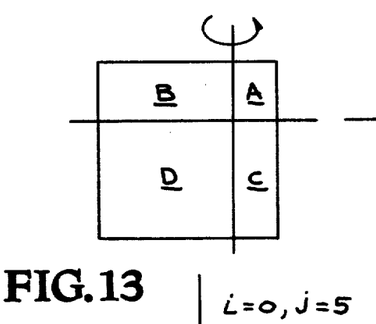
FIGS. 13–22 are representations of the steps of scrambling and descrambling the array of FIGS. 11 and 12.
Figure 14:
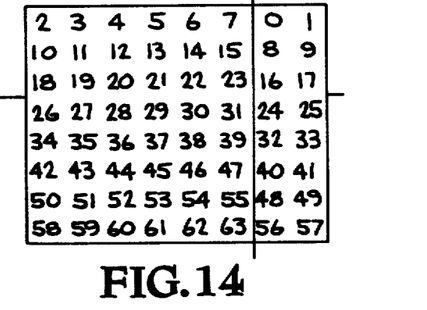
Figure 15:
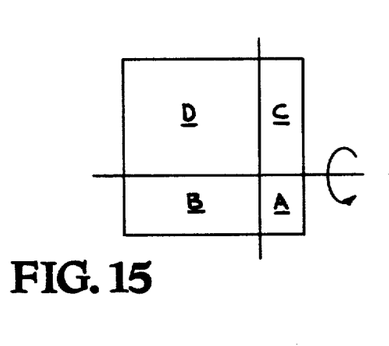
Figure 16:
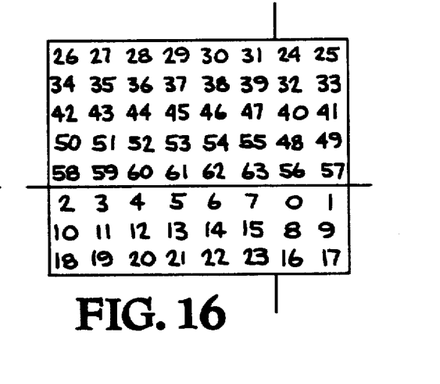

Referring to FIG. 12, in FIG. 12 there is provided an array of numbers 0–63. The numbers 0–63 represent the 64 bits in the array 36. As the bits in the array 36 are transferred from the bit map to the input of the barrel shifter 20 in the data processing unit 11, the bits are swizzled or rotated about an x and a y axis, as shown in FIGS. 13–16. The axis of rotation of the bits corresponds to the word boundaries 7 and 8, as shown in FIG. 11. That is to say, the groups of bits A and C are exchanged with the groups of bits B and D, as shown in FIGS. 13 and 14. Similarly, the groups of bits A and B are exchanged with the groups of bits C and D, as shown in FIGS. 15 and 16.

Figure 17:
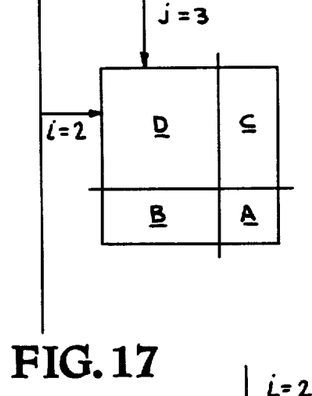
Figure 18:
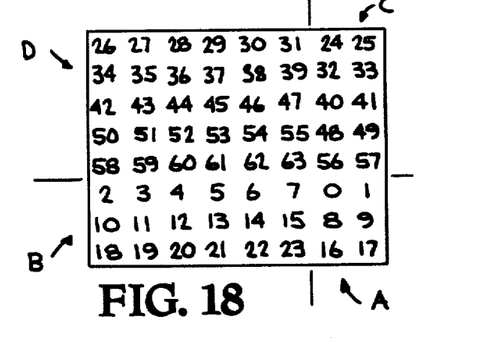

With the bits 0–63 appearing on the inputs of the barrel shifter 20 in the relative positions shown in FIG. 16, control signals A and B are applied to the barrel shifter 20. In the case of an 8×8×1 array in which the location of the array 36 was identified by i=6 and j=5, the control signals A and B are simply the complements of those addresses. That is to say, control signal A comprises i=2 and control signal B comprises j=3, as shown in FIG. 17. With i=2 and j=3, the position of the pixels 0–63, as shown in FIG. 18, are shifted or rotated about x and y axes in the barrel shifter 20 such that on the output of the barrel shifter 20 they are once again aligned and re-acquire their initial relative positions, as shown in FIG. 12.

Figure 19:
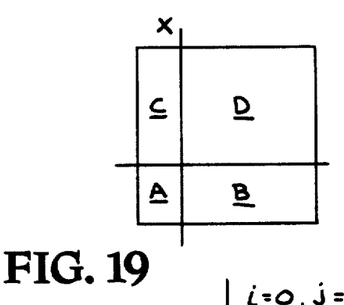
Figure 20:
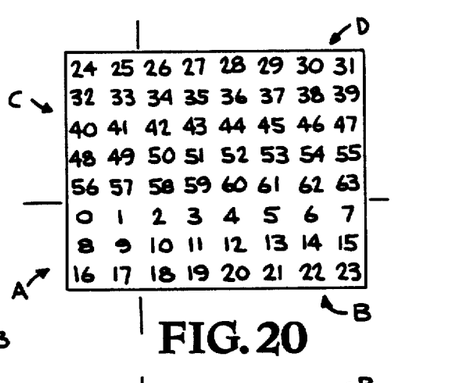
Figures 21, 22:
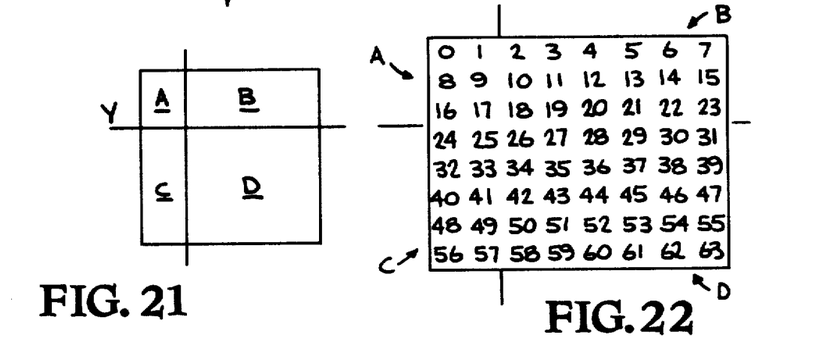

Referring to FIGS. 19–22, FIGS. 19 and 20 represent the shifting of the inputs through the barrel shifter that results in the interchange of the groups of bits C and A with the groups of bits D and B, as shown in FIGS. 19 and 20. Similarly, with i=0 and j=3 the barrel shifter interchanges the group bits A and B with the group bits C and D, as shown in FIGS. 21 and 22.

The barrel shifters 20 and 25 each comprise 64 inputs and 64 outputs. Each output is connected to a different one of the inputs by means of conventional switching circuits responsive to the signals A and B. In the case of an 8×8×1 array, the signal A=i and the signal B=j.

Figure 23:
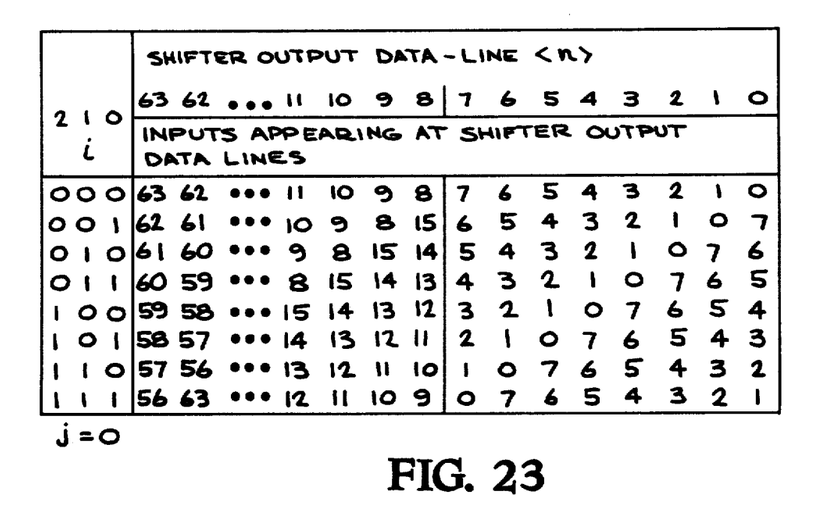
FIGS. 23 and 24 are tables showing the coupling of the outputs of the barrel shifter to the inputs of the barrel shifters of FIG. 10 for various values of A and B.
Figure 24:
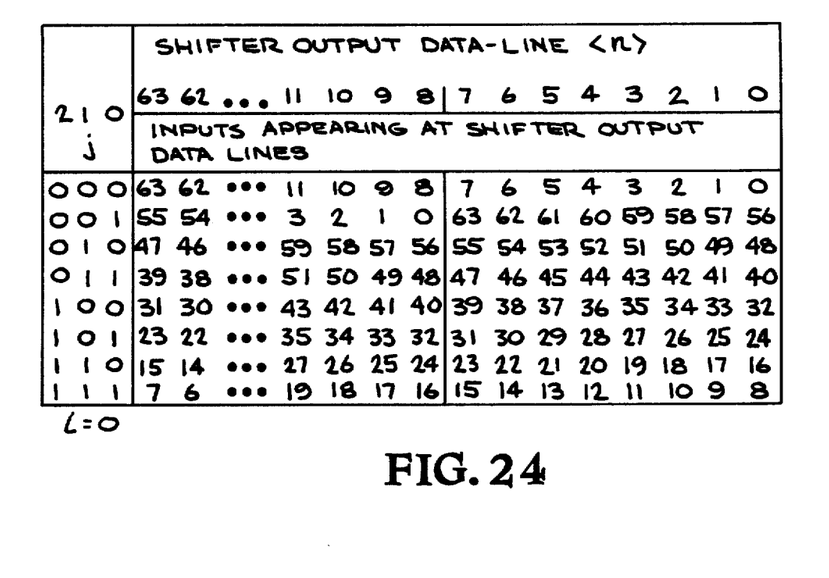

Referring to FIGS. 23 and 24, two tables are provided showing the relationship between the inputs and the outputs of the barrel shifters 20 and 25 for each value of i and j, respectively. To understand the application of the tables of FIGS. 23 and 24 to the operation of the barrel shifters 20 and 25, it is helpful to consider the 0–63 inputs and outputs of the barrel shifters to be arranged as shown in FIG. 12. Thus, if the inputs and outputs are considered as suggested when i and j are both 0, the value of the signal on output 0 of the barrel shifter will be the same as the value of the signal on input 0 of the barrel shifter. The value of the signal on output 1 of the barrel shifter will be the same as the value of the signal on input 1 of the barrel shifter. The value of the signal on output 2 of the barrel shifter will be the same as the value of the signal on input 2 of the barrel shifter, etc., such that the relative positions of the outputs of the barrel shifter are the same as the relative positions of the inputs to the barrel shifter.

When either or both of the control signals A and B to the barrel shifter change from 0 to a number within the range 0–7, all of the signals on the inputs of the barrel shifter are switched to appear on different outputs of the barrel shifter. For example, referring to FIGS. 13, 14 and 23, with A=i=6 and B=j=0, output 0 of the barrel shifter is coupled to input 2 of the barrel shifter. Output 1 of the barrel shifter is coupled to input 3 of the barrel shifter. Output 2 of the barrel shifter is coupled to input 4 of the barrel shifter. Output 3 of the barrel shifter is coupled to input 5 of the barrel shifter. Output 4 of the barrel shifter is coupled to input 6 of the barrel shifter. Output 5 of the barrel shifter is coupled to input 7 of the barrel shifter. Output 6 of the barrel shifter is coupled to input 0 of the barrel shifter. Output 7 is coupled to input 1 of the barrel shifter, etc.

Referring to FIGS. 14, 15, 16 and the third line from the bottom of the table of FIG. 24, with A=i=0 and B=j=5, the inputs of the barrel shifter as shown in FIG. 14 are coupled to the outputs of the barrel shifter as shown in FIG. 16. For example, output 0 of the barrel shifter (26 in FIG. 16) is coupled to input 24 of the barrel shifter (26 in FIG. 14). Output 1 of the barrel shifter (27 in FIG. 16) is coupled to input 25 of the barrel shifter (27 in FIG. 14). Output 2 of the barrel shifter (28 in FIG. 16) is coupled to input 26 of the barrel shifter (28 in FIG. 14), etc.

Figure 25:
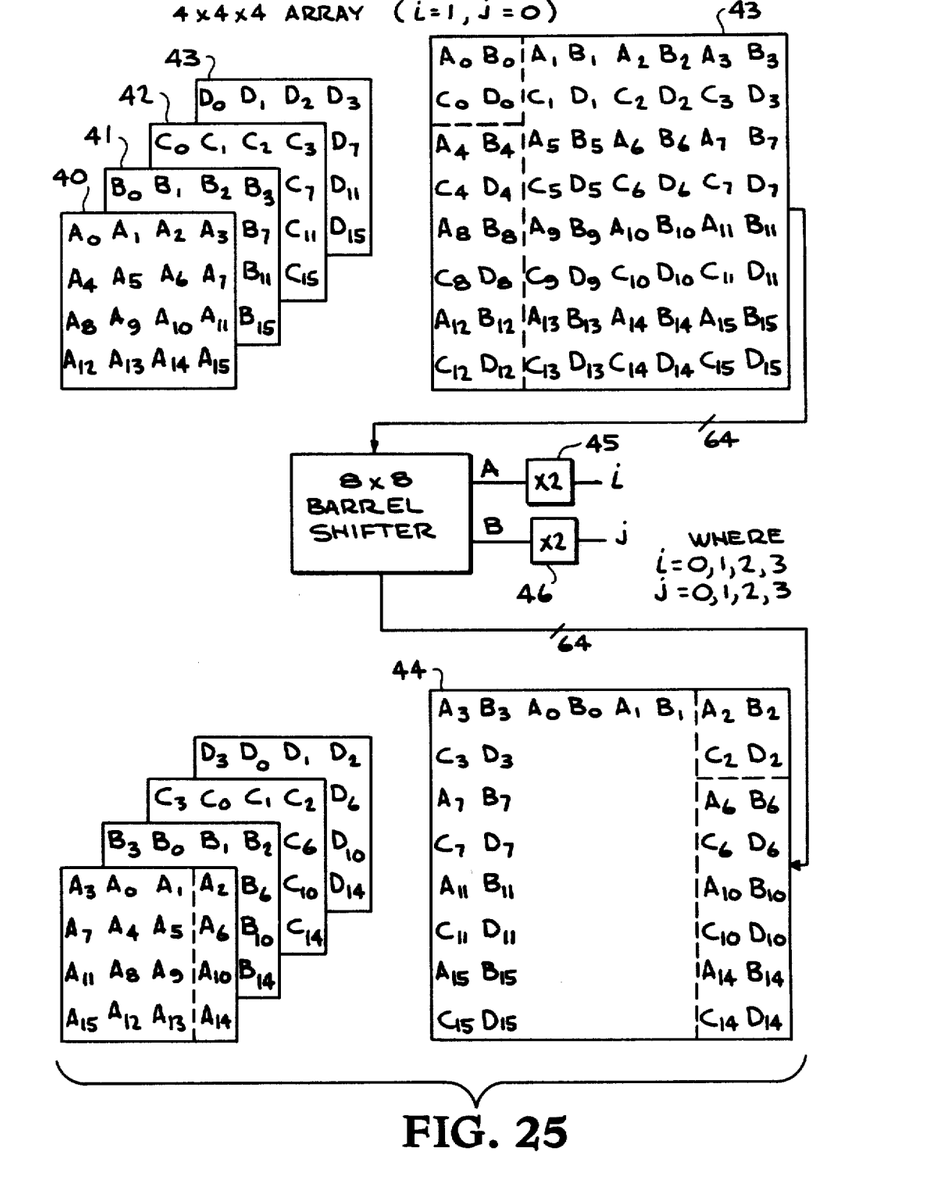
FIG. 25 is a representation of the shifting of the bits in a 4×4×4 array according to the present invention.

Referring to FIG. 25, there is further provided in accordance with the present invention a representation of a bit map comprising four planes of memory locations 40, 41, 42 and 43. Each of said planes 40–43 comprise a plurality of arrays of pixels, each of said arrays comprising four rows and four columns of storage locations. For convenience, the storage locations in one of the arrays in plane 40 are designated by the letters $A_0$–$A_{15}$. The storage locations in a corresponding array in plane 41 are designated $B_0$–$B_{15}$. The storage locations in a corresponding array in plane 42 are designated by $C_0$–$C_{15}$ and the storage locations in a corresponding array in plane 43 are designated $D_0$–$D_{15}$. Since all of the bits having the same location in each of the planes 40–43 such as bit $A_0$, $B_0$, $C_0$ and $D_0$ correspond to a single pixel on a display screen, they must be handled as a group. To accomplish this, the 64 bits in the planes 40–43 are transferred to the inputs of the barrel shifter via the MUX or switching circuit 19 under the control of the control signal C. The control signal C corresponds to the number of planes in the bit map such that barrel shifter inputs 0, 1, 8 and 9 receive bits $A_0$, $B_0$, $C_0$ and $D_0$, respectively. Barrel shifter inputs 2, 3, 10 and 11 receive bits $A_1$, $B_1$, $C_1$ and $D_1$, respectively, etc.

To shift bits $A_0$, $B_0$, $C_0$ and $D_0$ in the barrel shifter to compensate for scrambling of the bits when the bits are transferred from the bit map to the data processing unit, it is necessary to shift the bits as a group. This requires that for each value of i and j, two columns and two rows of bits must be shifted simultaneously.

As seen in to FIG. 25, there is provided on the inputs A and B of the barrel shifter a pair of ×2 multipliers 45 and 46, respectively. Since there are four planes, the values of i and j range from 0 to 3. For example, for i=1 and j=0, control signal A comprises 2 and control signal B comprises 0.

Referring to FIG. 23, with control signal A=2i=2 and control signal B=j=0, it will be seen from the third line of the table of FIG. 23 that output 0 of the barrel shifter ($A_3$ in block 44) is coupled to input 6 of the barrel shifter ($A_3$ in block 43). Output 1 of the barrel ($B_3$ in block 44) shifter is coupled to input 7 of the barrel shifter ($B_3$ in block 43). Output 2 of the barrel shifter ($A_0$ in block 44) is coupled to input 0 of the barrel shifter ($A_0$ in block 43). Output 3 of the barrel shifter ($B_0$ in block 44) is coupled to input 1 of the barrel shifter ($B_0$ in block 43), etc.

From the foregoing it can be seen that if j has a value between 0 and 3, the output of the barrel shifter will correspond to the table of FIG. 24 with B=2j, as discussed above.

Figure 26:
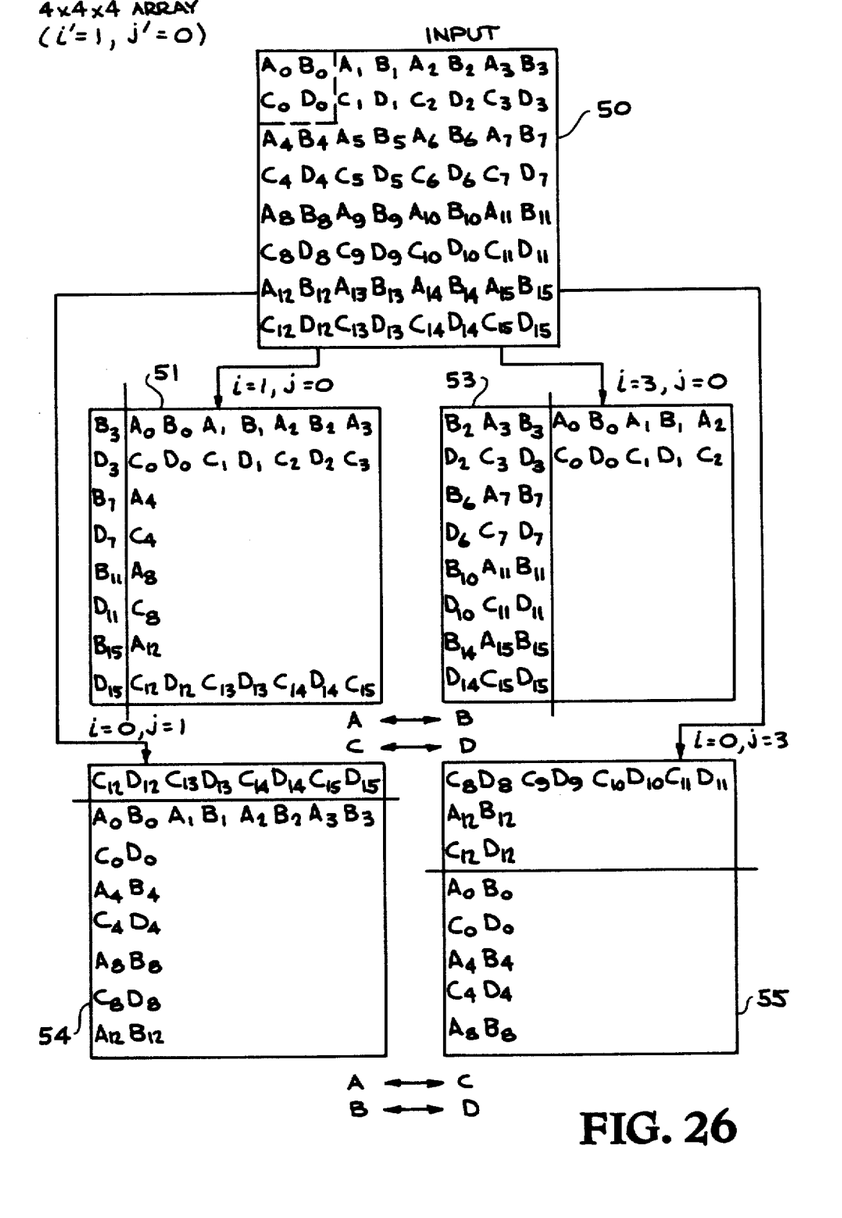
FIG. 26 is a representation showing the shifting of bits in a 4×4×4 array according to another embodiment of the present invention.

Referring to FIG. 26, it is found that by using the MUX or switching circuit 19 for providing inputs to the barrel shifter from a 4×4×4 array of memory locations such as described above with respect to FIG. 25 and by bypassing the ×2 multipliers 45 and 46 described above with respect to FIG. 25, swizzling or shifting inside planes can be changed to swizzling or shifting bits between planes. For example, assuming that the inputs of the barrel shifter are as shown in the block designated 50 in FIG. 26 and further assuming that i=1 and j=0 and using the second line of the table of FIG. 23, it can be seen that output 0 of the barrel shifter ($B_3$ in block 51) is coupled to input 7 of the barrel shifter ($B_3$ in block 50), output 1 of the barrel shifter ($A_0$ in block 51) is coupled to input 0 of the barrel shifter ($A_0$ in block 50), output 2 of the barrel shifter ($B_0$ in block 51) is coupled to input 1 of the barrel shifter ($B_0$ in block 50), etc., as shown by the designations in block 51 of FIG. 26.

Referring to the four bits $B_3$, $A_0$, $D_3$, $C_0$ in the upper lefthand corner of block 51 of FIG. 26 and the corresponding four bits $A_0$, $B_0$, $C_0$, $D_0$ in the upper lefthand corner of block 50 of FIG. 26, it can be seen that with i=1 and j=0 bits $A_0$ and $B_0$ are replaced by bits $B_3$ and $A_0$ and bits $C_0$ and $D_0$ are replaced by bits $D_3$ and $C_0$, respectively, showing that bits from plane 40 have been interchanged with bits from plane 41 and that bits from plane 42 have been interchanged with bits from plane 43. A further example of the interchange of bits between planes 40 and 41 and planes 42 and 43 is shown in block 53 of FIG. 26 with i=3 and j=0.

Referring to the lower portion of FIG. 26, there is provided two additional blocks 54 and 55, respectively. To obtain the output of the barrel shifter as shown in blocks 54 and 55, i=0 and j=1 and i=0 and j=3, respectively. For example, referring to block 54 and the second line of the table of FIG. 24 with i=0 and j=1, output 0 of the barrel shifter ($C_{12}$ in block 54) is coupled to input 56 of the barrel shifter ($C_{12}$ in block 50), output 1 of the barrel shifter ($D_{12}$ in block 54) is coupled to input 57 of the barrel shifter ($D_{12}$ in block 50), output 2 ($C_{13}$ in block 54) is coupled to input 58 of the barrel shifter ($C_{13}$ in block 50), etc. Similarly, referring to block 55 and the fourth line of the table of FIG. 24, when i=0 and j=3, output 0 of the barrel shifter ($C_8$ in block 55) is coupled to input 40 of the barrel shifter ($C_8$ in block 50), output 1 of the barrel shifter ($D_8$ in block 55) is coupled to input 41 of the barrel shifter ($D_8$ in block 50), output 2 of the barrel shifter ($C_9$ in block 55) is coupled to input 42 of the barrel shifter ($C_9$ in block 50), etc. From the foregoing, it can be seen that while various values of i resulted in interchanges of bits between planes 40 and 41 and 42 and 43, respectively, various values of j resulted in interchanges between planes 40 and 42 and 41 and 43, respectively. Of course, it should be understood that with various values of i and j other than 0, corresponding interchanges of bits between the various planes as described above will occur and, further, that such shifting or rotating operations of the bits while described sequentially for clarity can be and usually is accomplished simultaneously.

Figure 27:
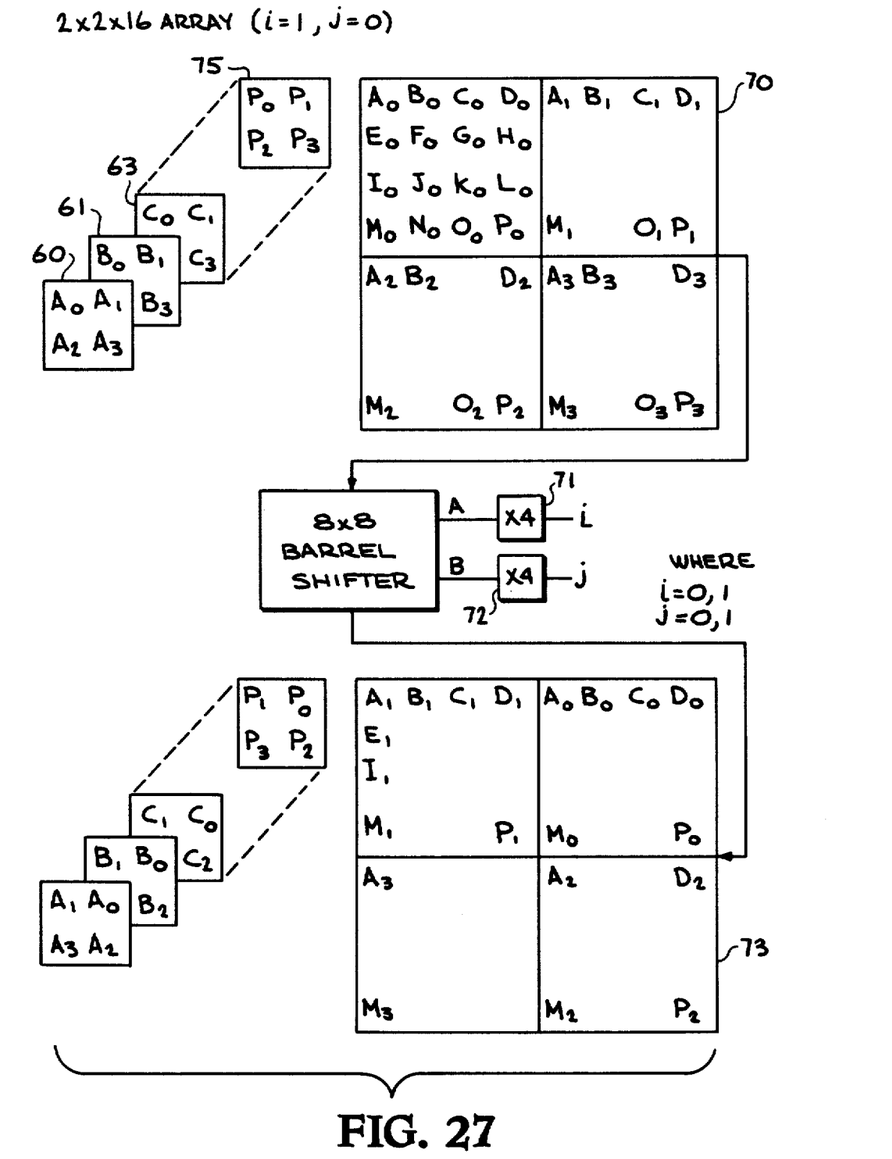
FIG. 27 is a representation of the shifting of bits in a 2×2×16 array according to another embodiment of the present invention.

Referring to FIG. 27, there is provided in another embodiment of the present invention a barrel shifter for shifting bits from a bit memory comprising a plurality of 16 planes, wherein each of said planes comprises a plurality of arrays and wherein each of said arrays comprises two rows and two columns of storage locations. As described above with respect to the apparatus of FIGS. 25 and 26, the multiplexer 19 under the control of an appropriate control signal C, transfers one of the bits from each of 16 planes in the bit map designated 60, 61, 62 . . . 75 to a group of 16 inputs as shown in the block 70. Because each of the arrays in the block 70 comprise four rows and four columns of inputs, the control signal lines A and B of the barrel shifter are each provided with a ×4 multiplier 71 and 72, respectively.

To shift the bits inside a plane in the apparatus of FIG. 27, either i or j, or both of them, equal 1. For example, for i=1 and j=0, A=4 and B=0. Referring to line 5 of the table of FIG. 23 with A=4i, output 0 of the barrel shifter ($A_1$ in block 73) is coupled to input 4 of the barrel shifter ($A_1$ in block 70), output 1 of the barrel shifter ($B_1$ in block 73) is coupled to input 5 of the barrel shifter ($B_1$ in block 70), output 2 of the barrel shifter ($C_1$ in block 73) is coupled to input 5 of the barrel shifter ($C_1$ in block 70), output 3 of the barrel shifter ($D_1$ in block 73) is coupled to input 7 of the barrel shifter ($D_1$ in block 70), output 4 of the barrel shifter ($A_0$ in block 73) is coupled to input 0 of the barrel shifter ($A_0$ in block 70), output 5 of the barrel shifter ($B_0$ in block 73) is coupled to input 1 of the barrel shifter ($B_0$ in block 70), etc.

While the above description of the operation of FIG. 27 shows how bits in each of the planes of the bit map are interchanged, it will be seen from the foregoing description of the operation of the apparatus of FIG. 26 that by bypassing the ×4 multipliers 71 and 72 from the apparatus, bits from one or more planes of the bit map can be interchanged with bits from one or more other planes of the bit map, all in accordance with the tables of FIGS. 23 and 24.

While an embodiment of the present invention is described above, it is contemplated that various modifications may be made thereto without departing from the spirit and scope thereof. For example, with suitable multipliers on one or both of the inputs to the barrel shifters, bits can be made to shift within planes as well as between planes. Accordingly, it is intended that the embodiment described be considered only as an illustration of the present invention and that the scope thereof should not be limited thereto but be determined by reference to the claims hereinafter provided.

What is claimed is:

1. A graphics processor with means for realigning arrays of data being transferred between a memory and a data processing unit comprising:
   a memory having a plurality of $2^{2(n-k)}$ planes of storage locations, where
   n is an arbitrary number with the property that $n \geq k$;
   $k = \log_2 AWS_x$,
   $AWS_x = AWS_y \geq 2$, and
   $AWS_x$ and $AWS_y$ are the number of pixels in an array on a screen in an x and a y direction, respectively;
   a barrel shifter having a plurality of rows and columns of inputs and a plurality of rows and columns of outputs for providing a plurality of $2^{2(n-k)}$ arrays of inputs and $2^{2(n-k)}$ arrays of outputs, each of said arrays of inputs comprising $2^k$ rows and $2^k$ columns of said inputs and each of said arrays of outputs comprising $2^k$ rows and $2^k$ columns of said outputs;
   means for transferring bits from said storage locations in said memory to said inputs of said barrel shifter such that each plane of said memory provides one bit for each $2^k \times 2^k$ array of inputs of said barrel shifter;
   means responsive to a first control signal (A) for selectively coupling said inputs of said barrel shifter to said outputs of said barrel shifter such that said outputs of said barrel shifter correspond to a shift in a position of a predetermined number of said columns of said inputs relative to the remaining columns of said inputs; and
   means responsive to a second control signal (B) for selectively coupling said inputs of said barrel shifter to said outputs of said barrel shifter such that said outputs of said barrel shifter correspond to a shift in a position of a predetermined number of said rows of said inputs relative to the remaining rows of said inputs.

2. A graphics processor according to claim 1 wherein said transferring means comprises:
   a switching network having $2^{2n}$ inputs and $2^{2n}$ outputs;
   means for coupling said inputs of said switching network to said storage locations in said memory; and
   means for coupling said outputs of said switching network to said inputs of said barrel shifter, said switching network being responsive to a control signal C corresponding to said $2^{2(n-k)}$ of planes of storage locations in said memory for selectively coupling said inputs of said switching network to said outputs of said switching network such that each plane of said memory provides said one bit for each of said $2^{2(n-k)}$ array of inputs of said barrel shifter.

3. A graphics processor according to claim 1 wherein said control signals (A) and (B) each comprises an even multiple of a control signal i and j, respectively, wherein $$i = \text{remainder}\left(\frac{x}{AWS_x}\right);$$

$$j = \text{remainder}\left(\frac{y}{AWS_y}\right);$$

x, y are the row and column addresses of a pixel on a screen; and $AWS_x$, $AWS_y$ are the number of pixels in an array on said screen in an x and a y direction, respectively, such that bits from each of said planes are interchanged with bits on the same plane.

4. A graphics processor according to claim 1 wherein said control signals (A) and (B) each comprises an odd multiple of a control signal i and j, respectively, wherein $$i = \text{remainder}\left(\frac{x}{AWS_x}\right);$$

$$j = \text{remainder}\left(\frac{y}{AWS_y}\right);$$

x, y are the row and column addresses of a pixel on a screen; and $AWS_x$, $AWS_y$ are the number of pixels in an array on said screen in an x and a y direction, respectively, such that bits from one of said planes are interchanged with bits from another of said planes.

5. A graphics processor according to claim 1 wherein n=3 and k=2 for providing a memory having 4 planes, each of said planes having 4 rows and 4 columns of storage locations.

6. A graphics processor according to claim 1 wherein n=3 and k=1 for providing a memory having 16 planes, each of said planes having 2 rows and 2 columns of storage locations.

7. A graphics processor according to claim 1 wherein n=4 and k=3 for providing a memory having 4 planes, each of said planes having 8 rows and 8 columns of storage locations.

8. A graphics processor according to claim 1 wherein n=4 and k=2 for providing a memory having 16 planes, each of said planes having 4 rows and 4 columns of storage locations.

9. A graphics processor according to claim 1 wherein n=4 and k=1 for providing a memory having 64 planes, each of said planes having 2 rows and 2 columns of storage locations.

10. In a graphics processor comprising a data processing unit, a memory having a plurality of $2^{2(n-k)}$ planes of storage locations, where n is an arbitrary number with the property that n≧k;
k=log$_2$ AWS$_x$,
AWS$_x$ =AWS$_y$ ≧2, and
AWS$_x$ and AWS$_y$ are the number of pixels in an array on a screen in an x and a y direction, respectively and a barrel shifter having a plurality of rows and columns of inputs and a plurality of rows and columns of outputs for providing a plurality of $2^{2(n-k)}$ arrays of inputs and $2^{2(n-k)}$ arrays of outputs, each of said arrays of inputs comprising $2^k$ rows and $2^k$ columns of said inputs and each of said arrays of outputs comprising $2^k$ rows and $2^k$ columns of said outputs, a method of realigning arrays of data being transferred between said memory and said data processing unit comprising the steps of:

transferring bits from said storage locations in said memory to said inputs of said barrel shifter such that each plane of said memory provides one bit for each $2^k \times 2^k$ array of inputs of said barrel shifter;

coupling in response to a first control signal (A) said inputs of said barrel shifter to said outputs of said barrel shifter such that said outputs of said barrel shifter correspond to a shift in a position of a predetermined number of said columns of said inputs relative to the remaining columns of said inputs; and coupling in response to a second control signal (B) said inputs of said barrel shifter to said outputs of said barrel shifter such that said outputs of said barrel shifter correspond to a shift in a position of a predetermined number of said rows of said inputs relative to the remaining rows of said inputs.

11. A method according to claim 10 wherein said transferring step comprises the steps of:

providing a switching network having $2^{2n}$ inputs and $2^{2n}$ outputs;

coupling said inputs of said switching network to said storage locations in said memory;

coupling said outputs of said switching network to said inputs of said barrel shifter; and selectively coupling in response to a control signal C corresponding to said $2^{2(n-k)}$ planes of storage locations in said memory said inputs of said switching network to said outputs of said switching network such that each plane of said memory provides said one bit for each of said $2^{2(n-k)}$ arrays of inputs of said barrel shifter.

12. A method according to claim 10 wherein said control signals (A) and (B) each comprises an even multiple of a control signal i and j, respectively, wherein i=remainder (x/AWS$_x$);
j=remainder (y/AWS$_y$);

x, y are the row and column addresses of a pixel on a screen;

AWS$_x$, AWS$_y$ are the number of pixels in an array on said screen in an x and a y direction, respectively, such that bits from each of said planes are interchanged with bits on the same plane.

13. A method according to claim 10 wherein said control signals (A) and (B) each comprises an odd multiple of a control signal i and j, respectively, wherein i=remainder (x/AWS$_x$);
j=remainder (y/AWS$_y$);

x, y are the row and column addresses of a pixel on a screen; and

AWS$_x$, AWS$_y$ are the number of pixels in an array on said screen in an x and a y direction, respectively, such that bits from one of said planes are interchanged with bits from another of said planes.

14. A method according to claim 10 wherein n=3 and k=2 for providing a memory having 2 planes, each of said planes having 4 rows and 4 columns of storage locations.

15. A method according to claim 10 wherein n=3 and k=1 for providing a memory having 16 planes, each of said planes having 2 rows and 2 columns of storage locations.

16. A method according to claim 10 wherein n=4 and k=3 for providing a memory having 2 planes, each of said planes having 8 rows and 8 columns of storage locations.

17. A method according to claim 10 wherein n=4 and k=2 for providing a memory having 16 planes, each of said planes having 4 rows and 4 columns of storage locations.

18. A method according to claim 10 wherein n=4 and k=1 for providing a memory having 64 planes, each of said planes having 2 rows and 2 columns of storage locations.

* * * * *